United States Patent
Unagami et al.

(10) Patent No.: US 8,435,425 B2
(45) Date of Patent: May 7, 2013

(54) POLAR DISPERSION COMPOSITION OF CARBON BLACK

(75) Inventors: Runa Unagami, Tokyo (JP); Atsushi Ito, Tokyo (JP); Yoshiyasu Kubo, Tokyo (JP); Norio Tobori, Tokyo (JP)

(73) Assignee: Lion Corporation, Tokyo (JP)

( * ) Notice: Subject to any disclaimer, the term of this patent is extended or adjusted under 35 U.S.C. 154(b) by 78 days.

(21) Appl. No.: 13/265,336

(22) PCT Filed: Apr. 26, 2010

(86) PCT No.: PCT/JP2010/057340
§ 371 (c)(1),
(2), (4) Date: Oct. 20, 2011

(87) PCT Pub. No.: WO2010/123137
PCT Pub. Date: Oct. 28, 2010

(65) Prior Publication Data
US 2012/0037853 A1    Feb. 16, 2012

(30) Foreign Application Priority Data

Apr. 24, 2009  (JP) ................. 2009-106742

(51) Int. Cl.
*H01B 1/24*    (2006.01)
(52) U.S. Cl.
USPC ........................................ 252/510; 427/122
(58) Field of Classification Search .......... 252/510, 252/511; 427/58, 122
See application file for complete search history.

(56) References Cited

U.S. PATENT DOCUMENTS

| | | | |
|---|---|---|---|
| 6,099,632 A * | 8/2000 | Nagasawa et al. | 106/31.9 |
| 6,770,397 B1 | 8/2004 | Maeda et al. | |
| 7,276,112 B2 * | 10/2007 | Tokuda et al. | 106/31.6 |
| 7,517,074 B2 * | 4/2009 | Hakamada et al. | 347/100 |
| 7,862,929 B2 | 1/2011 | Kim et al. | |
| 7,868,060 B2 * | 1/2011 | Sakai et al. | 523/160 |

FOREIGN PATENT DOCUMENTS

| | | |
|---|---|---|
| EP | 1 244 157 A1 | 9/2002 |
| JP | 2000-348537 A | 12/2000 |
| JP | 2001-35496 A | 2/2001 |
| JP | 2003-268053 A | 9/2003 |
| JP | 2006-516795 A | 7/2006 |
| JP | 2008-108649 A | 5/2008 |
| WO | 2004/091017 A1 | 10/2004 |

OTHER PUBLICATIONS

Kuroda et al "Charge-discharge properties of a cathode prepared with ketjan black . . . ", Journal of Power Sopurces 119-121 (2003) 924-928.*

* cited by examiner

*Primary Examiner* — Mark Kopec
(74) *Attorney, Agent, or Firm* — Nath, Goldberg & Meyer; Joshua B. Goldberg; Megan B. Doughty

(57) ABSTRACT

The invention provides a polar dispersion composition containing 0.5 to 30 parts by mass of an electroconductive carbon black and 0.1 to 30 parts by mass of a styrene-methoxy polyethylene glycol methacrylate copolymer, with respect to 100 parts by mass of the polar dispersion composition. The composition of the invention is easy to handle as a liquid preparation, and develops sufficient electroconductivity when processed into a conductive material.

9 Claims, No Drawings

POLAR DISPERSION COMPOSITION OF CARBON BLACK

This is a National Phase Application filed under 35 U.S.C. 371 as a national stage of PCT/JP2010/057340, filed on April 26, 2010, and claims benefit from Japanese Patent Application No. 2009-106742, filed on Apr. 24, 2009, the entire content of which is hereby incorporated by reference in its entirety.

TECHNICAL FIELD

The present invention relates to a polar dispersion composition of electroconductive carbon black in polar dispersion medium, a material coated with the polar dispersion composition, and a method for producing the coated material. The polar dispersion of the invention is preferably used for coating compounds, electrodes of secondary batteries and the like.

BACKGROUND ART

A slurry dispersion prepared by dispersing electroconductive carbon black in a polar liquid (a polar dispersion medium) is processed into a film, which is used for production of the cathode and anode of various kinds of secondary batteries, electroconductive coat and the like.

For example, JP 2006-516795 A discloses as a slurry of anode active material for lithium secondary batteries an aqueous slurry comprising a carbon-based anode active material, carbon black as an electroconductive agent, a binder (binder resin) comprising a styrene-butadiene polymeric resin, a thickener comprising a cellulose or acrylate resin, and a dispersant having a polymeric main chain which has surface-adsorbable characteristics and aside chain which has nonionic surfactant properties.

As a slurry of cathode active material for lithium secondary batteries, JP 2008-108649 A discloses an aqueous slurry comprising lithium-transition metal oxide powders (as a cathode active material), carbon powders (as an electroconductive agent), a binder resin comprising a water-dispersible polymer such as polytetrafluoroethylene, poly vinylidene fluoride or the like, and a viscosity modifier such as carboxymethyl cellulose, polyvinyl alcohol or the like.

SUMMARY OF INVENTION

In the above-mentioned aqueous slurries, a highly hydrophobic material like carbon black is so difficult to be dispersed in a polar dispersion medium such as an aqueous medium. Therefore, a dispersant having a surface activity is used. However, when ketjen black, which is one kind of electroconductive carbon black and has a large surface area and shows a strong tendency of particle aggregation, is used as the electroconductive agent, the viscosity of the resultant slurry increases and then it may cause a difficult handling problem of a liquid preparation. Further, when the aqueous slurry is used to produce an electroconductive material, a binder resin is added to the slurry to enhance the adhesion of the aqueous slurry to a support, which may hinder the resultant electroconductive material from developing sufficient electroconductivity although the aqueous slurry has high dispersion properties.

Accordingly, an object of the invention is to provide a polar dispersion composition of electroconductive carbon black in polar dispersion medium that can be conveniently handled as a liquid preparation and can exhibit sufficient electroconductivity when formed into an electroconductive material.

Another object of the invention is to provide an article obtainable from the above-mentioned polar dispersion composition in polar dispersion medium.

Also, a further object of the invention is to provide a method for producing a material coated with a polar dispersion composition of carbon black in polar dispersion medium, which material is capable of exhibiting sufficient electroconductivity.

As a result of the intensive studies, the inventors of the invention found that the above-mentioned objects can be achieved by using a particular nonionic dispersant. Namely, the present invention provides a polar dispersion composition of an electroconductive carbon black dispersed in a polar dispersion medium using a nonionic dispersant, used to obtain an electroconductive coat by mixing the polar dispersion composition with a binder resin to prepare a coating liquid and subjecting the coating liquid to coating, where the electroconductive carbon black has a DBP oil absorption number of 300 to 600 mL/100 g, the nonionic dispersant is a copolymer of a monomer (a) and a monomer (b) with a molar ratio (a)/(b) of 5/95 to 95/5, having a weight-average molecular weight of 1,000 to 1,000,000 and a cloud point of 30° C. or more and the normal boiling point of the polar dispersion medium or less in the polar dispersion medium, wherein the monomer (a) comprises at least one aromatic vinyl monomer unit as a structure unit, and the monomer (b) is an ethyleneoxide adduct of (meth) acrylic acid alkyl ester, represented by formula (1):

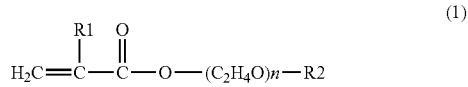

(where R1 is hydrogen atom or methyl group, R2 is a saturated or unsaturated straight-chain or branched aliphatic hydrocarbon group having 1 to 30 carbon atoms, and n indicates the average number of added moles and is 5 to 50); and 0.5 to 30 parts by mass of the electroconductive carbon black and 0.1 to 30 parts by mass of the nonionic dispersant are contained in 100 parts by mass of the polar dispersion composition in polar dispersion medium.

The invention provides an article obtainable from the above-mentioned polar dispersion composition.

Also, the invention provides a method for producing a material coated with a polar dispersion composition of an electroconductive carbon black having a DBP oil absorption number of 300 to 600 mL/100 g dispersed in a polar dispersion medium using a nonionic dispersant, comprising the steps of:

(I) mixing the polar dispersion composition with a binder resin to obtain a coating liquid, (II) coating the coating liquid onto a material, and (III) drying the coated material to form a coat, wherein the coating liquid coated on the material is controlled to have a temperature higher than the cloud point of the nonionic dispersant in the polar dispersion medium in the process of formation of the coat.

The polar dispersion composition of the invention exhibits high dispersion properties and low viscosity, thereby leading to good handling properties. When the composition of the invention is mixed with a binder for the purpose of coating, a highly electroconductive coat can be obtained by controlling the temperature higher than the cloud point in the process of forming a coat.

DESCRIPTION OF EMBODIMENTS

[Carbon Black]

The carbon black used in the invention is an electroconductive carbon black with a DBP oil absorption number of 300 to 600 mL/100 g (hereinafter also referred to as a particular carbon black). The carbon black of which the DBP oil absorption number is within the above-mentioned range is excellent in electroconductivity, and at the same time, the effects of the invention can desirably be exhibited because the above-mentioned carbon black easily tends to aggregate and therefore increases the viscosity of a slurry when the slurry of carbon black is prepared using a polar dispersion medium. The DBP oil absorption number can be determined in accordance with ASTM D2414.

The carbon black used in the invention may preferably have a BET specific surface area of 200 to 1600 $m^2/g$, more preferably 700 to 1400 $m^2/g$. The carbon black of which the BET specific surface area is within the above-mentioned range is excellent in electroconductivity, and the effects of the invention can desirably be exhibited because the above-mentioned carbon black easily tends to aggregate and therefore increases the viscosity of a slurry when the slurry of carbon black is prepared using a polar dispersion medium. The BET specific surface area can be determined by iodine adsorption method.

In addition, the volatile matter of the carbon black may preferably be 1.0 mass % or less. The volatile matter can be determined in such a manner that the volatile loss on heating is determined after a carbon black sample is heated in a dryer of 105±1° C. for 60 minutes, cooled to room temperature in a desiccator, and allowed to stand at 950±20° C. for 7 minutes. The volatile loss on heating with respect to the mass of the sample is calculated, which is regarded as the volatile matter (mass %).

The production method of carbon black is not particularly limited. For example, it is preferable to use furnace black, in particular ketjen black, obtainable by burning hydrocarbons such as petroleum.

The carbon black is contained in an amount of 0.5 to 30 parts by mass, preferably 2 to 25 parts by mass, and more preferably 5 to 15 parts by mass, with respect to 100 parts by mass of the polar dispersion composition of the invention. When the amount of carbon black is less than 0.5 parts by mass, the amount of the polar dispersion medium that should be removed by drying in the process of formation of a coat becomes excessive inefficiently. On the other hand, when the amount of carbon black exceeds 30 parts by mass, most part of the dispersion medium will be absorbed by carbon black, thereby extremely decreasing the fluidity of the dispersion composition. This may considerably decrease the handling properties.

[Polar Dispersion Medium]

The term "polar dispersion medium" herein used means any polar dispersion medium having a relative dielectric constant of 10 or more. For example, there can be used water; lower alcohols having 1 to 4 carbon atoms such as methanol, ethanol, isopropyl alcohol and the like; glycols having 2 to 4 carbon atoms, such as ethylene glycol, propylene glycol, diethylene glycol and the like; other polar dispersion mediums such as glycerin, N-methyl-2-pyrrolidone and the like; and mixtures thereof. In particular, water, N-methyl-2-pyrrolidone, and the mixtures of water with any of the above-mentioned polar dispersion mediums other than water are preferred as the polar dispersion medium because the desired effects of the invention can be more easily obtained. Especially, water and the aqueous solvent, i.e., the mixtures of water with any of the above-mentioned polar liquids other than water are preferable. The aqueous solvent may contain water in an amount of 80 mass % or more. The content of water may be 100 mass %.

[Nonionic Dispersant]

The nonionic dispersant used in the invention is a copolymer of the above-mentioned monomer (a) and monomer (b) with a molar ratio (a)/(b) of 5/95 to 95/5, having a weight-average molecular weight (Mw) of 1,000 to 1,000,000 and a cloud point of 30° C. or more and the normal boiling point or less of the polar dispersion medium.

Examples of the monomer (a) include styrene, α-methyl styrene, p-methyl styrene and the like. In particular, styrene is advantageous.

As for the monomer (b), in formula (1), R1 may preferably be methyl group. R2 may be a saturated or unsaturated straight-chain or branched aliphatic hydrocarbon group having 1 to 30 carbon atoms, preferably a straight-chain alkyl group having 1 to 6 carbon atoms.

When the nonionic dispersant has a cloud point of 30° C. or more and the boiling point or less of the polar dispersion medium to be used, sufficient dispersing properties can be obtained at the temperatures lower than the cloud point and therefore the handling is convenient before coating step. Further, in the formation of a coat, the temperatures equal to or higher than the cloud point can be readily attained at atmospheric pressure, which is advantageous to the coating method of the invention. The cloud point is preferably 40° C. or more, more preferably 50° C. or more. When the polar dispersion medium with a low volatility is used and the coat is formed by drying under reduced pressure, the cloud point of the nonionic dispersant is required to be lower than the temperature chosen for the drying under reduced pressure. It is desirable to use a nonionic dispersant of which the cloud point is lower than the temperature chosen for the drying at normal pressure or under reduced pressure in the formation of a coat, preferably by 5° C. or more, more preferably by 10° C. or more.

When any of the above-mentioned aqueous solvent is used as the polar dispersion medium, the cloud point of the nonionic dispersant in water may be 30 to 100° C., preferably 40 to 80° C., and more preferably 50 to 60° C. When the cloud point is within the above-mentioned range, the dispersing performance of carbon black is satisfactory, and in addition, the coat can be formed at the temperatures equal to or higher than the cloud point of the dispersant, which will readily attain the desired effect of obtaining a highly electroconductive coat. The cloud point herein used may be controlled by adjusting the molar ratio of (a) to (b) and the average number of added moles (n) of ethylene oxide.

The molar ratio of the monomer (a) to the monomer (b) is 5/95 to 95/5, preferably 15/85 to 85/15, and more preferably 30/70 to 70/30. With the molar ratio as stated above, the dispersion properties of carbon black is satisfactory and the cloud point can easily be controlled to the desired temperature as mentioned above.

The monomers (a) and (b) may be arranged into a block copolymer or random copolymer.

The average number of added moles (n) of ethylene oxide may be 5 to 50, more preferably 7 to 25 in order to obtain satisfactory dispersion of the carbon black and to control the cloud point to the desired temperature as mentioned above.

The cloud point herein used is a value obtainable by the following method. After a solution containing 0.5 mass % of a dispersant in a polar dispersion medium is prepared, 80 g of the above-mentioned solution of the dispersant is weighed into a 100-ml transparent glass container equipped with a thermometer and a stirrer. The temperature of the solution is gradually increased with stirring in a hot water bath. The glass container is taken out of the hot water bath when the solution is heated to a temperature higher by 3 to 5° C. than the temperature where the solution first becomes turbid. The temperature on the thermometer where the turbidity disappears is read by visual inspection while the solution is allowed to stand at room temperature (25° C.).

The weight-average molecular weight (Mw) of the nonionic dispersant is 1,000 to 1,000,000, preferably 3,000 to 500,000, and more preferably 5,000 to 100,000. When the Mw of the nonionic dispersant is within the above-mentioned range, the dispersibility of carbon black can be preferably improved. The Mw can be determined by gel permeation chromatography (GPC) using PEGs as standard samples.

The nonionic dispersant is contained in an amount of 0.1 to 30 parts by mass, preferably 1 to 10 parts by mass, with respect to 100 parts by mass of the polar dispersion composition according to the invention. When the content of the nonionic dispersant is less than 0.1 parts by mass, a sufficient dispersing effect may not be obtained. With the nonionic dispersant of more than 30 parts by mass, development of electroconductivity may be inhibited when a coat is formed.

[Viscosity]

The composition of the invention may preferably have a viscosity at 20° C. of 100 Pa·s or less, more preferably 10 Pa·s or less, and most preferably 1 Pa·s or less. When the viscosity of the composition is within the above-mentioned range, the binder resin can homogeneously blended with the composition prior to the coating step and the coating step can be conducted with no difficulty. The viscosity can be determined using a rotational viscometer with a single cylindrical rotor (B-type viscometer). The rotor No. 3 or No. 4 may be appropriately chosen depending on the viscosity and rotated at 30 rpm under the temperature of 25° C. to read the value two minutes after initiation of the rotation.

[Method for Preparing a Polar Dispersion Composition in Polar Dispersion Medium]

The composition of the invention can be obtained by mixing and stirring the polar dispersion medium, the nonionic dispersant and carbon black according to any of the known methods. Preferably, the dispersant and carbon black may be added to the polar dispersion medium. For example, after a dispersant is added to a polar dispersion medium, the resultant mixture is thoroughly stirred, for example at 1000 rpm for 10 minutes, using a disperser (e.g., T.K. ROBOMIX Model 2.5, made by PRIMIX Corporation) or the like. Then, carbon black is added to the mixture, followed by stirring. Preferably, the obtained mixture may be further subjected to dispersing operation at 1000 rpm for one hour, for example, using a beads mill with a vessel where 1-mm-diameter zirconia beads are charged up to 50% of the total capacity (e.g., a batch type sand grinder with a single cylinder Model BSG-1/4, made by AIMEX Co., Ltd.).

[Coated Material, Conductive Coating Compound, Electrode for Battery]

When the polar dispersion composition of the invention is formed into a film and dried, electroconductivity is developed because of the presence of carbon black. Therefore, the composition of the invention can be used for any applications where electricity is required to flow. Specific examples of the articles that can be made from the composition of the invention include coated materials, conductive coating compounds, electrodes for batteries, secondary batteries and the like. Specifically, when the composition of the invention further comprises a pigment, which is one of the components commonly contained in the coating compounds, a conductive coating compound can be obtained. For another application, an electrode active material is added to the composition of the invention if necessary, and the resultant mixture is coated on a current collector such as an aluminum foil, copper foil or the like, thereby obtaining an electrode for batteries. In any case, it is recommended to add a binder to the composition of the invention for improving the adhesion to the material to be coated.

Preferably, the binder may have a particle diameter of 0.01 to 0.5 μm, and more preferably 0.01 to 0.3 μm. When the binder with a particle diameter of less than 0.01 μm is added, the viscosity of the obtained mixture of the composition according to the invention with the binder may excessively increase. The binder with a particle diameter of 0.5 μm, the adhesion to the current collector will tend to decrease.

It is preferable to use water-based binders where water is used as a solvent or dispersion medium. Specifically, thermoplastic resins, polymers with rubber elasticity, polysaccharides, and mixtures thereof can be used.

To be more specific, there can be used polytetrafluoroethylene, polyethylene, polypropylene, ethylene-propylene copolymer, polybutadiene, butyl rubber, fluororubber, polyethylene oxide, polyvinyl pyrrolidone, polyepichlorohydrin, polyphosphagen, polyacrylonitrile, polystyrene, polymethyl methacrylate, ethylene-propylene-diene copolymer, polyvinyl pyridine, polyvinyl acetate, chlorosulfonated polyethylene, styrene-butadiene copolymer latex, polyester resin, acrylic resin, phenolic resin, epoxy resin, polyvinyl alcohol, cellulose resins such as carboxymethyl cellulose (CMC), hydroxypropyl cellulose, nitrocellulose and the like, fluoropolymers such as polytetrafluoroethylene, polyvinylidene fluoride, fluorinated polyvinylidene fluoride and the like, diene polymers such as styrene butadiene rubber (SBR), acrylonitrile butadiene rubber (NBR) and the like, acrylate polymers such as 2-ethylhexyl acrylate, methacrylic acid-acrylonitrile-ethylene glycol dimethacrylate copolymer and the like.

Particularly, styrene-butadiene copolymer latex and polytetrafluoroethylene are preferred, which may be used as an emulsion prepared, for example by emulsion polymerization.

The styrene-butadiene copolymer contained in the above-mentioned styrene-butadiene copolymer latex has structural units of an aliphatic conjugated diene monomer, an aromatic vinyl compound monomer, and a vinyl monomer having an acid component.

Examples of the conjugated dienic aliphatic monomer include 1,3-butadiene, isoprene, 2-chloro-1,3-butadiene, chloroprene and the like. From the viewpoint of adhesion to the current collector, 1,3-butadiene is preferable. In the styrene-butadiene copolymer, the content of butadiene may preferably be in the range of 30 to 85 mass %, more preferably 30 to 70 mass %, and most preferably 30 to 60 mass %. When the content of butadiene is less than 30 mass %, the adhesion to the current collector and the flexibility of the obtained electrode tend to be insufficient. On the other hand, the content of more than 85 mass % may also result in lack of adhesion to the current collector.

Examples of the aromatic vinyl compound monomer include styrene, α-methylstyrene, p-methylstyrene, vinyltoluene, chlorostyrene and the like. In particular, styrene is preferred. In the styrene-butadiene copolymer, the content of styrene may preferably be in the range of 3 to 60 mass %, more preferably 10 to 60 mass %. When the content of styrene is less than 3 mass %, the resultant slurry for electrodes of the secondary battery tends to show low stability. When the content of styrene exceeds 60 mass %, the resultant polymer becomes so hard that the adhesion tends to worsen.

Examples of the vinyl monomer containing acid component include itaconic acid, acrylic acid, methacrylic acid, fumaric acid, maleic acid and the like. In particular, itaconic acid, acrylic acid and methacrylic acid are preferred in terms of the polymerization stability and the dispersion stability.

The styrene-butadiene copolymer latex may be synthesized by the conventional emulsion polymerization method or the commercially available products may be used. For example, the commercially available product, TRD1002 made by JSR Corporation can be used. For the emulsion polymerization, anionic surfactants, nonionic surfactants, amphoteric surfactants and the like are usable as the emulsifiers. Those emulsifiers may be used alone or in combination. Examples of the anionic surfactants include higher alcohol sulfate esters, alkyl benzene sulfonate salts, aliphatic sulfonate salts, sulfate esters of polyethylene glycol alkyl ethers and the like. Examples of the nonionic surfactants include polyethylene glycol alkyl esters, polyethylene glycol alkyl ethers, polyethylene glycol alkylphenyl ethers, and the like. There can be used amphoteric surfactants having as an anionic moiety a carboxylate salt, sulfuric ester salt, sulfonic acid salt, phosphoric ester salt or the like, and as a cationic moiety an amine salt, quaternary ammonium salt or the like. Specific examples of the amphoteric surfactants include betaines such as lauryl betaine, stearyl betaine and the like, and amino acid compounds such as lauryl-β-alanine, stearyl-β-alanine, lauryldi(aminoethyl)glycine, octyldi(aminoethyl)glycine and the like.

The above-mentioned polytetrafluoroethylene can also be obtained by emulsion polymerization of tetrafluoroethylene. The emulsion polymerization is generally carried out by subjecting tetrafluoroethylene to emulsion polymerization in water in the presence of an emulsifier and a dispersion stabilizer. For example, paraffin wax can be used as the dispersion stabilizer and a water-soluble fluorine-containing dispersant can be used as the dispersant. Some commercially available products, for example, Polyflon PTFE D-210C (made by Daikin Industries, Ltd.) and the like can be used.

The amount of binder to be added may appropriately be determined according to the application, but preferably be 0.1 to 1000 times, more preferably 1 to 100 times, and most preferably 10 to 50 times on a basis of mass that of the particular carbon black contained in the polar dispersion composition according to the invention.

When the proportion of the binder is too low, the resultant coat lacks mechanical strength. When the proportion of the binder is too high, the electroconductivity may be lowered.

[Method for Producing Coated Material]

In the process of producing a coated material using a polar dispersion composition according to the invention, it is possible to obtain a highly electroconductive coat by setting the temperature higher than the cloud point of the nonionic dispersant contained in the polar dispersion composition in the formation of a coat. To be more specific, the following method can be employed:

Step (I)

A binder is added to the composition of the invention to obtain a coating liquid. Then, a coated material, e.g., an electrode for the battery can be obtained by coating the above-mentioned coating liquid on a material, e.g., a current collector such as an aluminum foil, copper foil or the like.

Step (II)

To coat the composition of the invention on the surface of the material, the coating methods using a bar coater, a spray gun or the like may be employed. In this case, the thickness of the coated material may preferably be 10 to 500 μm, more preferably 50 to 300 μm.

The coating liquid may be subjected to the coating step as it is at room temperature, or the coating liquid may be heated for the coating step. When the coating thickness is thin, for example as thin as about 10 to 500 μm, the coat will start to form immediately after the coating step or in the course of the coating step. In such a case, the coat is unfavorably completed before the temperature of the coating liquid exceeds the cloud point of the nonionic dispersant, with the result that the coated material may not develop sufficient electroconductivity. Then, the coating liquid may preferably be heated prior to the coating operation. The coating liquid may be heated to a temperature higher than the cloud point of the nonionic dispersant contained in the coating liquid, preferably by 20° C. or more, more preferably 40° C. or more.

Step (III)

After coating the coating liquid on the material, the surface of the material is dried for obtaining a coat. The formation of a coat is carried out under the conditions that the temperature of the coating liquid is higher than the cloud point of the nonionic dispersant contained in the coating liquid.

More specifically, the coating liquid which is heated to a temperature higher than the cloud point of the nonionic dispersant contained in the coating liquid, preferably by 2° C. or more, more preferably by 5° C. or more may be coated on the material, and then dried. In this case, the coating liquid may be allowed to stand for drying.

Alternatively, when the unheated coating liquid is coated on the material, or when the coating liquid that is heated to temperatures equal to or lower than the cloud point of the nonionic dispersant is coated on the material, the material coated with the coating liquid may be dried in a dryer preheated at a temperature higher than the cloud point of the nonionic dispersant. Namely, the coated material may be placed under the temperatures higher than the cloud point of the nonionic dispersant. In this case, the surrounding temperature of the coated material may preferably be higher than the cloud point by 20° C. or more, more preferably by 40° C. or more.

The drying may be carried out at normal pressures or under reduced pressure. In light of convenience, the drying may preferably be carried out at normal pressures. However, when a low-volatile dispersion medium such as N-methyl-2-pyrrolidone or the like is used, drying may be carried out under reduced pressure.

When a high-volatile polar dispersion medium, in particular, an aqueous solvent is used, volatilization of the aqueous solvent accelerates the formation of a coat before the temperature of the coating liquid coated on the material exceeds the cloud point of the nonionic dispersant. In such a case, the desired effects of the invention cannot be exhibited easily. Therefore, it is recommended that the coated material be placed into a dryer quickly, to be more specific, within several minutes after completion of the coating step. This can provide the coated material with sufficient electroconductivity. Namely, although the nonionic dispersant first exhibits a dispersing effect to allow the carbon black to flow throughout the coating liquid, the formation of a coat can be initiated after the dispersing effect is reduced by heating to a temperature equal to or higher than the cloud point of the nonionic dispersant.

When the coating liquid heated to a temperature of less than 100° C. is used for the formation of a coat, or when the dryer is preset to a temperature of less than 100° C. for the formation of a coat, the coated material may be then heated at about 100° C. after formation of the coat in order to evaporate water contained in the obtained coat for removal of water content. However, if the temperature does not reach the cloud point or more of the used nonionic dispersant in the course of formation of a coat, the effects of the invention cannot be obtained even though the drying is carried out at the temperature equal to or higher than the cloud point after the formation of a coat.

[Secondary Battery]

The electrode for batteries according to the invention can be used as the cathode or anode of the secondary battery, preferably as the cathode of lithium secondary battery. Generally, the cathode active material does not show sufficient electronic conduction properties, so that the cathode active material is used for the cathode together with an electroconductive assistant such as carbon black, acetylene black or the like. To make a cathode, typically, a cathode mix prepared by mixing a cathode active material, an electroconductive material, a binder and a solvent is coated on a cathode current collector (for example, refer to JP Kokai Hei 6-333558). The binder is used as a binding agent to bind the cathode active material and the electroconductive material to the cathode current collector. In consideration of the improvement of battery performance, it is desired that the amount of binder be as small as possible for binding the cathode active material and the electroconductive material. The content of binder may be 0.1 to 30 parts by mass, preferably 0.5 to 10 parts by mass, and more preferably 1 to 6 parts by mass, with respect to 100 parts by mass of the cathode active material.

The cathode active material may be any material that can adsorb and release lithium ion, for example, lithium cobalt oxides, lithium nickel oxides, lithium iron oxides, $LiFePO_4$ or the like. The content of the active material in the cathode may be 50 to 99.9 mass %, preferably 80 to 99 mass %, and more preferably 90 to 98 mass %.

To produce the cathode of lithium secondary batteries, the predetermined amounts of a polar dispersion composition polar dispersion medium according to the invention, a binder such as styrene butadiene rubber (SBR) and a cathode active material are mixed using a mixer or dispersion mixer such as homogenizer, dissolver, beads mill, sand mill or the like to prepare a cathode mix as the coating liquid as previously mentioned in the step (I). Then, as stated in the step (II), a predetermined amount of the cathode mix is coated on the surface of a current collector such as an aluminum foil, copper foil, lithium foil, stainless steel sheet or the like using a proper coating equipment (e.g., slit coater, die coater, comma coater or the like). The coating weight (i.e., the coating weight per unit area of the current collector) is not particularly restricted, but may vary according to the purpose and the application.

After completion of the coating step, the drying step may be carried out at a temperature equal to or higher than the cloud point of the dispersant contained in the polar dispersion, as mentioned in the step (III), whereby a cathode of the lithium secondary battery can be produced. By drying the cathode mix at a temperature equal to or higher than the cloud point of the dispersant, the obtainable electroconductivity becomes higher even though the proportion of the electroconductive material in the cathode is the same as conventional. In other words, the same electroconductivity can be obtained as conventional with the reduced amount of electroconductive material. The thus obtained electrode is adjusted to have a uniform thickness by means of roller coating using an applicator roll or the like, screen coating, doctor blade method, spin coating, bar coater method or the like, and then can be formed into a desired shape.

As previously explained, the polar dispersion composition of carbon black according to the invention, which is a composition where carbon black is dispersed in a polar dispersion medium as the dispersion medium using a particular nonionic dispersant can exhibit high dispersibility and a proper viscosity for easy handling. Further, in the method for making a material coated with the polar dispersion composition of the invention, a highly electroconductive coat can be obtained by controlling the temperature where the coat is formed to a temperature higher than the cloud point of the nonionic dispersant contained in the polar dispersion composition. The mechanism where the above-mentioned effects of the invention can be exhibited has not been clarified, but is supposed to be as follows:

The electroconductive material such as carbon black can exhibit the conductivity in such a fashion that aggregation of carbon black particles forms a conductive path for flowing electricity in an insulating material such as a thermoplastic resin or the like. In other words, development of the conductivity by carbon black is known to result from the network structure formed by the carbon black particles in the insulating material. It is therefore considered that when a dispersant having high dispersibility is used in dispersing the carbon black in a polar dispersion medium, the network formed by aggregation of the carbon black particles is broken, and when the resultant dispersion is coated, formation of the network by the carbon black particles becomes difficult because of the high dispersion properties, with the result that electroconductivity cannot easily be developed. In contrast to this, the present invention employs a particular nonionic dispersant having a cloud point. The surface activity of the dispersant can produce good dispersibility at temperatures lower than the cloud point, while the dispersant is hindered from developing the surface activity and therefore the dispersibility is reduced by heating to the temperature higher than the cloud point, so that the aggregation of the carbon black particles can be accelerated to exhibit high electroconductivity.

To obtain the effects of the invention, which are presumably based on the above-mentioned mechanism, it is essential that after completion of the coating step, the temperature of the coating liquid be higher than the cloud point of the nonionic dispersant while the coating liquid is still in a liquid form, i.e., before the liquid starts to form a solid resin film to fix the carbon black particles therein.

EXAMPLES

The nonionic dispersants used to prepare polar dispersion compositions are as follows.

TABLE 1

| | Structure | (a)/(b) | n | Cloud point (° C.) | Mw |
|---|---|---|---|---|---|
| Dispersing agent 1 | Styrene - methoxypolyethylene glycol methacrylate copolymer ($R^1$=$CH_3$, $R^2$=$CH_3$) | 30/70 | 23 | 96 | 17145 |
| Dispersing agent 2 | Styrene - methoxypolyethylene glycol methacrylate copolymer ($R^1$=$CH_3$, $R^2$=$CH_3$) | 70/30 | 9 | 50 | 20500 |

TABLE 1-continued

| | Structure | (a)/(b) | n | Cloud point (° C.) | Mw |
|---|---|---|---|---|---|
| Dispersing agent 3 | Styrene - methoxypolyethylene glycol methacrylate copolymer ($R^1$=$CH_3$, $R^2$=$CH_3$) | 50/50 | 9 | 62 | 23900 |
| Dispersing agent 4 | Methacrylic acid - methyl methacrylate - methoxy polyethylene glycol methacrylate copolymer | — | 25 | — | 23000 |
| Dispersing agent 5 | Polyoxyethylene cetyl ether | — | 20 | — | 1122 |

[Measurement of Cloud Point of Dispersant]

After an aqueous solution containing 0.5 mass % of a dispersant was prepared at 25° C., 80 g of the above-mentioned aqueous solution of dispersant was weighed into a 100-ml transparent glass container equipped with a thermometer and a stirrer. The temperature of the aqueous solution was gradually increased with stirring in a hot water bath. The glass container was taken out of the hot water bath when the solution was heated to a temperature higher by 3 to 5° C. than the temperature where the solution first became turbid. The temperature on the thermometer where the turbidity disappeared was read by visual inspection while the solution was allowed to stand at room temperature (25° C.). The above-mentioned procedures were repeated three times, and the average thus obtained was regarded as the cloud point.

[Measurement of Weight-Average Molecular Weight (Mw) of Dispersant]

The gel permeation chromatography (GPC) (HLC-8020, made by Tosoh Corporation) was employed to calculate the Mw of the dispersant using PEGs (with molecular weights of 20,000, 10,890, 5,000, 1,000 and 200) as standard samples.

The carbon blacks used to prepare polar dispersion compositions are as follows:

TABLE 2

| | Ketjen black EC (made by Lion Corporation) | Acetylene black (for comparison, made by Denki Kagaku Kogyo Kabushiki Kaisha.) |
|---|---|---|
| Average primary particle diameter | 0.040 μm | 0.035 μm |
| Specific surface area (BET method) | 800 $m^2$/g | 68 $m^2$/g |
| DBP oil absorption number | 365 ml/100 g | 175 ml/100 g |
| Shape | Powders | Powders |

The average primary particle diameter was determined using a transmission electron microscope.

The specific surface area (BET method) was determined by iodine adsorption method.

The DBP oil absorption number was determined in accordance with ASTM D2414, using a DBP absorptmeter.

As the binder resin, a styrene-butadiene latex (TRD1002, made by JSR Corporation, a water-based emulsion having a solid content of about 50%) was used.

Example 1

[Preparation of Carbon Black Slurry]

8.2 g of the above-mentioned dispersant 1 was added to 83.5 g of deionized water, followed by stirring in a disperser (at 1000 rpm) for 10 minutes. With the addition of 8.3 g of ketjen black EC as the carbon black, the resultant mixture was stirred for 20 minutes (at 2500 rpm). Then, the mixture was dispersed at 1000 rpm for one hour in a beads mill (i.e., a batch type sand grinder with a single cylinder Model BSG-1/4, made by AIMEX Co., Ltd.) where 1-mm-diameter zirconia beads were charged up to 50% of the total capacity. A carbon black slurry was thus obtained, which was subjected to measurement of the viscosity.

[Preparation of Coating Liquid]

A styrene-butadiene latex was added to the obtained carbon black slurry as a binder (at the ratio by mass of carbon black slurry to binder of 25/75). The resultant mixture was stirred at 500 rpm for five minutes, thereby obtaining a coating liquid.

[Preparation of Sheet]

A 5 cm×5 cm square of PPC paper (Type N, made by Nippon Paper Group, Inc.) was prepared as the support of sheet.

At the room temperature (25° C.), 2 ml of the coating liquid (of 25° C.) was dropped onto the above-mentioned high quality paper using a pipette marked with the scale of 2 ml, and then coated to have a thickness of 0.076 mm using a bar coater (a cylindrical coating rod of 0.076 mm, made by Kumagai Riki Kogyo Co., Ltd.)

Within one minute after completion of the coating, the above-mentioned high quality paper was placed into a dryer preset at 120° C. (an oven Model DX600, made by Yamato Scientific Co., Ltd.). The drying step was conducted at normal pressure for 12 hours to form a coat. Thus, a sheet was obtained.

After completion of the drying step, the electroconductive sheet was taken out from the oven and allowed to stand for about 10 minutes. The sheet cooled to room temperature was subjected to measurement of the electroconductivity.

Example 2

[Preparation of Carbon Black Slurry]

A carbon black slurry was obtained in the same manner as in Example 1 except that the dispersant 1 was replaced by the dispersant 2.

[Preparation of Coating Liquid]

A coating liquid was obtained in the same manner as in Example 1 except that the ratio by mass of carbon black slurry to binder was changed to 35/65.

[Preparation of Sheet]

The coating liquid thus obtained was coated on the high quality paper to have a thickness of 0.076 mm in the same manner as in Example 1.

Within one minute after completion of the coating, the above-mentioned high quality paper was placed into a dryer preset at 85° C. (an oven Model DX600, made by Yamato Scientific Co., Ltd.). The sheet was dried at normal pressure for 12 hours to form a coat, and then dried at 100° C. for one hour. Thus, an electroconductive sheet was obtained.

After completion of the drying step, the electroconductive sheet was taken out from the oven and allowed to stand for about 10 minutes. The sheet cooled to room temperature was subjected to measurement of the electroconductivity.

Example 3

[Preparation of Carbon Black Slurry]

A carbon black slurry was obtained in the same manner as in Example 1 except that the dispersant 1 was replaced by the dispersant 3.

[Preparation of Coating Liquid and Sheet]

A coating liquid was obtained in the same manner as in Example 2, and a sheet was prepared in the same manner as in Example 2 using the above-mentioned coating liquid.

Example 4

[Preparation of Sheet]

The coating liquid obtained in Example 2 was heated for 30 minutes at 85° C. that was higher than the cloud point of the dispersant 2 to cause phase-separation. The thus obtained carbon black slurry was coated on the high quality paper to have a thickness of 0.076 mm in the same manner as in Example 1.

The above-mentioned high quality paper was dried at room temperature (25° C.) for 12 hours to form a coat. Then, the paper was dried at normal pressure for one hour in an oven preset at 100° C. Thus, a sheet was obtained.

Example 5

[Preparation of Sheet]

Using the coating liquid obtained in Example 3, a sheet was prepared in the same manner as in Example 4 except that the high quality paper was dried at room temperature (25° C.) for 13 hours to form a coat.

Comparative Example 1

[Preparation of Sheet]

Using the coating liquid obtained in Example 1, a sheet was prepared in the same manner as in Example 1 except that the coated high quality paper was dried for four hours at 85° C. that was lower than the cloud point of the dispersant 1 to form a coat, and then the paper was dried at normal pressure for one hour in an oven preset at 100° C.

Comparative Example 2

[Preparation of Sheet]

Using the coating liquid obtained in Example 2, a sheet was prepared in the same manner as in Example 2 except that the coated high quality paper was dried for four hours at 25° C. that was lower than the cloud point of the dispersant 2.

Comparative Example 3

[Preparation of Sheet]

Using the coating liquid obtained in Example 3, a sheet was prepared in the same manner as in Example 3 except that the coated high quality paper was dried for four hours at 25° C. that was lower than the cloud point of the dispersant 3.

Comparative Example 4

[Preparation of Carbon Black Slurry]

A carbon black slurry was obtained in the same manner as in Example 1 except that the dispersant 1 was replaced by the dispersant 4.

Comparative Example 5

[Preparation of Carbon Black Slurry]

A carbon black slurry was obtained in the same manner as in Example 1 except that the dispersant 1 was replaced by the dispersant 5.

Comparative Example 6

[Preparation of Carbon Black Slurry, Coating Liquid, and Sheet]

A carbon black slurry was obtained in the same manner as in Example 1 except that the ketjen black EC was replaced by the acetylene black. Then, a coating liquid and a sheet were obtained in the same manner as in Example 1.

Comparative Example 7

[Preparation of Carbon Black Slurry, Coating Liquid, and Sheet]

A carbon black slurry was obtained in the same manner as in Example 1 except that the ketjen black EC was replaced by the acetylene black. Then, a coating liquid was then obtained in the same manner as in Example 1. Finally, a sheet was prepared in the same manner as in Example 1 except that the coated high quality paper was dried for four hours at 40° C. that was lower than the cloud point of the dispersant 1 to form a coat, and then the paper was dried at normal pressure for one hour in an oven preset at 100° C.

Comparative Example 8

[Preparation of Carbon Black Slurry, Coating Liquid, and Sheet]

A carbon black slurry was obtained in the same manner as in Example 2 except that the dispersant 2 was replaced by the dispersant 5 and the ketjen black EC was replaced by the acetylene black as the carbon black. Then, a coating liquid was then obtained in the same manner as in Example 2, and finally, a sheet was prepared in the same manner as in Example 2.

Evaluation Methods

[Evaluation of Dispersing Properties (Measurement of Viscosity)]

The dispersing properties were evaluated by measuring the viscosity of the obtained carbon black slurry. As the shear rate was continuously changed from 1 to 100 (1/s)/180 seconds using a stress control type rheometer (HAAK RheoStress RS-100), the shear rate was determined corresponding to the viscosity previously measured after rotating a rotor No. 4 at 30 rpm for two minutes at 25° C. using a B-type viscometer (BL type: made by Tokimec Inc.). Then, the measurement of the viscosity was conducted at the determined shear rate (5 1/s) for two minutes, and the stabilized value was regarded as the viscosity of the sample. The measurement was conducted at 25° C. using a cone plate (35 mm×4°). The results are shown in Table 3.

[Evaluation of Electroconductivity]

The surface resistivity of each of the sheets obtained in the above-mentioned Examples and Comparative Examples was measured to evaluate the electroconductivity. In accordance with the method of ASTM D257, the measurement was conducted using a commercially available Digital Multimeter Model 2506A (made by Yokogawa Electric Corporation) when the sheet showed a surface resistivity of 1.0E+9 (Ω) or less, and using a commercially available Digital ultra-high resistance/micro current meter R8340 (made by Advantest Corporation) when the sheet showed a high surface resistivity of more than 1.0E+9 (Ω). The results are shown in Table 3.

TABLE 3

| | Dispersing Agent No. | Carbon Black | Viscosity of Slurry (mPa·s) | Temp. of slurry when coated (°C.) | Surrounding temp. in drying step (°C.) | Surface Resistivity (Ω) | Remarks |
|---|---|---|---|---|---|---|---|
| Ex. 1 | 1 | Ketjen black EC | 20 | 25 | 120 | 2.3.E+07 | coating -->drying (≧cloud point) |
| Ex. 2 | 2 | Ketjen black EC | 21 | 25 | 85 | 8.0.E+05 | coating -->drying (≧cloud point) |
| Ex. 3 | 3 | Ketjen black EC | 45 | 25 | 85 | 3.4.E+05 | coating -->drying (≧cloud point) |
| Ex. 4 | 2 | Ketjen black EC | 21 | 85 | 25 | 8.6.E+05 | heating of slurry (≧cloud point) --> coating --> drying |
| Ex. 5 | 3 | Ketjen Black EC | 45 | 85 | 25 | 2.4.E+05 | heating of slurry (≧cloud point) --> coating --> drying |
| Comp. Ex. 1 | 1 | Ketjen black EC | 20 | 25 | 85 | 6.0.E+09 | coating --> drying (≦cloud point) |
| Comp. Ex. 2 | 2 | Ketjen black EC | 21 | 25 | 25 | 5.8.E+07 | coating --> drying (≦cloud point) |
| Comp. Ex. 3 | 3 | Ketjen black EC | 45 | 25 | 25 | 3.2.E+07 | coating --> drying (≦cloud point) |
| Comp. Ex. 4 | 4 | Ketjen black EC | 1500 | 25 | Slurry became too thick to produce a sheet. | not measured | |
| Comp. Ex. 5 | 5 | Ketjen black EC | >20000 | 25 | Slurry became too thick to produce a sheet. | not measured | |
| Comp. Ex. 6 | 1 | Acetylene black | 20 | 25 | 120 | 2.5.E+11 | |
| Comp. Ex. 7 | 1 | Acetylene black | 20 | 25 | 40 | 6.2.E+11 | |
| Comp. Ex. 8 | 5 | Acetylene black | 20 | 25 | 85 | 2.5.E+11 | |

The invention claimed is:

1. A polar dispersion composition of an electroconductive carbon black dispersed in a polar dispersion medium using a nonionic dispersant, used to obtain an electroconductive coat by mixing the polar dispersion composition with a binder resin to prepare a coating liquid and subjecting the coating liquid to a coating operation, wherein
the electroconductive carbon black has a DBP oil absorption number of 300 to 600 mL/100 g,
the nonionic dispersant is a copolymer of a monomer (a) and a monomer (b) with a molar ratio (a)/(b) of 5/95 to 95/5, having a weight-average molecular weight of 1,000 to 1,000,000 and a cloud point in the polar dispersion medium of 30° C. or more and the normal boiling point or less of the polar dispersion medium, where
the monomer (a) comprises at least one aromatic vinyl monomer unit as a structure unit, and
the monomer (b) is an ethyleneoxide adduct of (meth) acrylic acid alkyl ester, represented by formula (1):

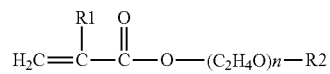

(1)

where R1 is hydrogen atom or methyl group, R2 is a saturated or unsaturated straight-chain or branched aliphatic hydrocarbon group having 1 to 30 carbon atoms, and n indicates the average number of added moles and is 5 to 50; and
5 to 30 parts by mass of the electroconductive carbon black and 0.1 to 30 parts by mass of the nonionic dispersant are contained in 100 parts by mass of the polar dispersion composition.

2. The polar dispersion composition of claim 1, wherein the nonionic dispersant is a copolymer of (a) styrene and (b) a compound of formula 1 where R1 is methyl group and R2 is a straight-chain or branched aliphatic hydrocarbon group having 1 to 8 carbon atoms.

3. The polar dispersion composition of claim 1, wherein the polar dispersion medium is an aqueous dispersion medium comprising 80 mass% or more of water, and the nonionic dispersant has a cloud point of 30 to 100° C. in water.

4. The polar dispersion composition of claim 1, wherein the carbon black has a BET specific surface area of 200 to 1600 m²/g.

5. The polar dispersion composition of claim 1, wherein the carbon black is ketjen black.

6. An article prepared from the polar dispersion composition of claim 1.

7. The article of claim 6, wherein the article is a secondary battery.

8. A method for producing a material coated with a polar dispersion composition of an electroconductive carbon black having a DBP oil absorption number of 300 to 600 mL/100 g dispersed in a polar dispersion medium using a nonionic dispersant, comprising the steps of:
(I) mixing the polar dispersion composition of claim 1 with a binder resin to obtain a coating liquid,
(II) coating the coating liquid onto a material, and
(III) drying the coated material to form a coat, where the coating liquid coated on the material is controlled to have a temperature higher than the cloud point of the nonionic dispersant in the polar dispersion medium in the process of formation of the coat in the step (III).

9. The method of claim 8, wherein the coating liquid obtained in the step (I) is heated to a temperature higher than the cloud point of the nonionic dispersant contained in the coating liquid and coated on the material in the step (II).

* * * * *